United States Patent
Cho et al.

(10) Patent No.: US 8,845,168 B2
(45) Date of Patent: Sep. 30, 2014

(54) BACKLIGHT ASSEMBLY, METHOD OF MANUFACTURING THE SAME AND DISPLAY APPARATUS HAVING THE SAME

(75) Inventors: Hyun-Min Cho, Seoul (KR); Jae-Byung Park, Seoul (KR); Don-Chan Cho, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 140 days.

(21) Appl. No.: 13/364,216

(22) Filed: Feb. 1, 2012

(65) Prior Publication Data
US 2012/0250347 A1 Oct. 4, 2012

(30) Foreign Application Priority Data

Apr. 4, 2011 (KR) ........................ 10-2011-0030467

(51) Int. Cl.
*F21V 7/04* (2006.01)
*G02B 26/00* (2006.01)
*F21V 8/00* (2006.01)

(52) U.S. Cl.
CPC ............ *G02B 6/0055* (2013.01); *G02B 26/001* (2013.01); *G02B 6/0036* (2013.01)
USPC ............ 362/606; 362/607; 362/615; 362/600

(58) Field of Classification Search
USPC .............. 362/606–607, 615–628; 349/61–65; 345/204
See application file for complete search history.

(56) References Cited

U.S. PATENT DOCUMENTS

| | | | |
|---|---|---|---|
| 6,642,913 B1* | 11/2003 | Kimura et al. | 345/84 |
| 7,110,176 B2* | 9/2006 | Maruta et al. | 359/459 |
| 7,515,229 B2* | 4/2009 | Chang | 349/114 |
| 7,566,940 B2* | 7/2009 | Sasagawa et al. | 257/419 |
| 7,847,880 B2* | 12/2010 | Kim et al. | 349/61 |
| 2004/0125457 A1* | 7/2004 | Umemoto et al. | 359/599 |
| 2007/0031097 A1* | 2/2007 | Heikenfeld et al. | 385/129 |
| 2007/0222911 A1* | 9/2007 | Murase | 349/58 |
| 2008/0218843 A1* | 9/2008 | Sasagawa et al. | 359/291 |
| 2009/0296193 A1* | 12/2009 | Bita et al. | 359/291 |
| 2010/0118515 A1* | 5/2010 | Tanaka et al. | 362/97.1 |
| 2010/0155705 A1* | 6/2010 | Shin et al. | 257/40 |
| 2010/0225993 A1* | 9/2010 | Cho et al. | 359/292 |
| 2010/0302218 A1* | 12/2010 | Bita et al. | 345/204 |
| 2011/0249219 A1* | 10/2011 | Evans et al. | 349/63 |
| 2012/0099048 A1* | 4/2012 | Yamazaki et al. | 349/62 |

FOREIGN PATENT DOCUMENTS

| | | |
|---|---|---|
| JP | 2009-540503 | 11/2009 |
| KR | 100763397 B1 | 9/2007 |
| KR | 0977890 | 8/2010 |

* cited by examiner

*Primary Examiner* — Peggy Neils
*Assistant Examiner* — Erin Kryukova
(74) *Attorney, Agent, or Firm* — Innovation Counsel LLP

(57) ABSTRACT

A backlight assembly includes a light source part, a base substrate, an insulation layer, and a reflection layer. The base substrate includes a light incident surface into which the light from the light source part is incident, and a light exiting surface adjacent to the light incident surface and through which the light exits. The insulation layer is formed on the light exiting surface of the base substrate. The reflection layer is formed on the insulation layer and forms a concave pattern along with the base substrate and the insulation layer and has an opening portion through which the light exiting from the light exiting surface passes.

20 Claims, 11 Drawing Sheets

Tl: TRANSMITTANCE OF LIGHT GUIDE PLATE AND TRNASMITTANCE OF BASE SUBSTRATE
Pa: REFLECTIVITY OF BASE SUBSTRATE
Ar: APERTURE RATIO
dp: EFFECTIVE PATTERN DENSITY
Pr: REFLECTIVITY OF REFLECTIVE PLATE
Ts: TRANSMITTANCE OF OPTICAL SHEETS (UPWARD)
T's: TRNASMITTANCE OF OPTICAL SHEETS (DOWNWARD)
Ws: LOSS OF OPTICAL SHEETS (UPWARD)
W's: LOSS OF OPTICAL SHEETS (DOWNWARD)

TI: TRANSMITTANCE OF BASE SUBSTRATE
Pa: REFLECTIVITY OF BASE SUBSTRATE
Ar: APERTURE RATIO
dp: EFFECTIVE PATTERN DENSITY
Pr: REFLECTIVITY OF REFLECTIVE PLATE
Ts: TRANSMITTANCE OF OPTICAL SHEETS
Ws: LOSS OF OPTICAL SHEETS

BACKLIGHT ASSEMBLY, METHOD OF MANUFACTURING THE SAME AND DISPLAY APPARATUS HAVING THE SAME

CROSS-REFERENCE TO RELATED APPLICATIONS

This application claims priority under 35 U.S.C. §119 to Korean Patent Application No. 10-2011-0030467, filed on Apr. 4, 2011 in the Korean Intellectual Property Office (KIPO), the contents of which are herein incorporated by reference in their entirety.

BACKGROUND

1. Field of the Invention

Example embodiments of the disclosed subject matter relate to a backlight assembly, a method of manufacturing the backlight assembly, and a display apparatus having the backlight assembly.

2. Description of the Related Art

A display apparatus based on a micro electro-mechanical system MEMS includes a light source part, a light guide plate, an opening plate, a digital micro shutter (DMS), and a reflection layer. The light guide plate includes a light incident surface into which light emitted from a light source is incident, a light facing surface facing the light incident surface, a light exiting surface through which the light exits, and a light reflection surface facing the light exiting surface. The opening plate includes a material reflecting light and has an opening portion through which the light exiting from the light guide plate passes. The DMS is disposed on the opening plate and opens and closes the opening portion of the opening plate. The reflection layer reflects light leaked from the light guide plate toward the light guide plate.

A convex pattern such as a triangle shape is formed on the light reflection surface of the light guide plate to emit the light incident from the light source toward the opening plate. In addition, a density of the convex pattern increases to increase a uniformity of the light exiting through the light exiting surface.

In the display apparatus based on the MEMS system, a portion of the light exiting from the light guide plate does not pass through the opening portion of the opening plate, is reflected by the opening plate and the reflection layer, and is re-incident to the light guide plate to increase light-using efficiency, so that the light may be recycled.

However, when the density of the convex pattern formed on the light reflection surface of the light guide plate increases, the light, which is reflected by the opening plate and the reflection layer and re-incident to the light guide plate, does not progress toward the light exiting surface of the light guide plate, but progresses toward the light incident surface and the light facing surface, or is scattered. Thus, light-using efficiency may be degraded.

In addition to the light guide plate, a glass substrate for the opening plate is required in the display apparatus, and thus a thickness of the display apparatus may increase.

SUMMARY

Example embodiments of the present invention provide a backlight assembly capable of enhancing light-using efficiency and decreasing a thickness of a display apparatus, a method of manufacturing the above-mentioned backlight assembly, and a display apparatus having the above-mentioned backlight assembly.

DETAILED DESCRIPTION

Figure 1:
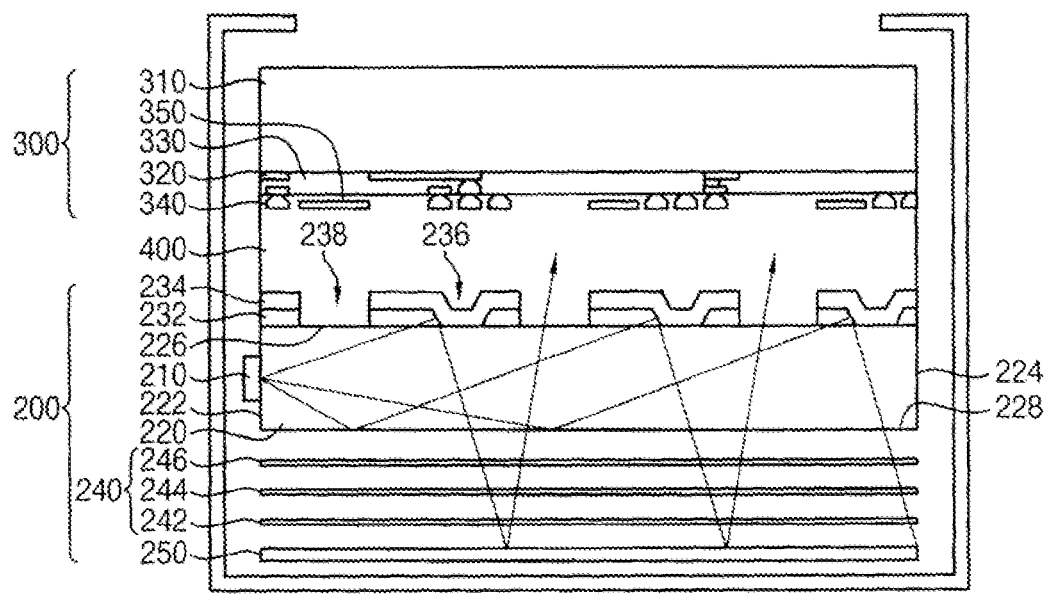
FIG. 1 is a cross-sectional view illustrating a display apparatus according to an example embodiment.

FIG. 1 is a cross-sectional view illustrating a display apparatus according to an example embodiment.

Referring to FIG. 1, the display apparatus 100 of the present example embodiment includes a backlight assembly 200 and a display panel 300.

The backlight assembly 200 includes a light source part 210, a first base substrate 220, an insulation layer 232, a reflection layer 234, and a reflection plate 250.

The light source part 210 emits light to the first base substrate 220. The light source part 210 may include a plurality of light sources generating light having a first color, light having a second color, and light having a third color. For example, the light source part 210 may include at least one light emitting diode (LED).

The first base substrate 220 receives the light emitted from the light source part 210. The first base substrate 220 includes a light incident surface 222 into which the light emitted from the light source part 210 is incident, a light facing surface 224 facing the light incident surface 222, a light exiting surface 226 connected to the light incident surface 222 and the light facing surface 224 and through which the light incident from the light source part 210 exits toward the display panel 300, and a light reflection surface 228 facing the light exiting surface 226 and reflecting the light in the first base substrate 220. For example, the first base substrate 220 may include a glass material.

The insulation layer 232 and the reflection layer 234 are sequentially laminated on the first base substrate 220. An opening or a recess is formed at the insulation layer 232, the reflection layer 234 is formed on the insulation layer 232 at which the opening or the recess is formed, and thus a concave pattern 236 is formed at the reflection layer 234. Thus, the reflection layer 234 forms the concave pattern 236 along with the insulation layer 232. The concave pattern 236 includes an inclined surface. The opening or recess is formed in the insulation layer 232 and the reflection layer 234 is formed in the opening. As such, the reflection layer 234 may make contact with the first base substrate 220.

An opening portion 238 passing through the insulation layer 232 and the reflection layer 234 is formed in the insulation layer 232 and the reflection layer 234. The opening portion 238 is formed at an area not overlapping with an area at which the concave pattern 236 is formed, and a portion of the light exiting from the light exiting surface 226 of the first base substrate 220 passes through the opening portion 238 toward the display panel 300.

The reflection layer 234 reflects light not exiting through the opening portion 238. The reflection layer 234 includes the concave pattern 236 concave toward the first base substrate 220, and thus light bumped into the concave pattern 236 is inconsistent with a total reflection condition of light and exiting toward the reflection plate 250 as passing through the first base substrate 220. For example, the reflection layer 234 may include an aluminum material.

The insulation layer 232 is formed under the reflection layer 234 to increase a reflectivity of the reflection layer 234. For example, the insulation layer 232 may include two layers, and respective layers may include a silica (SiO2) material and a titanium dioxide (TiO2) material.

FIGS. 2A to 2D are cross-sectional views illustrating examples of the concave pattern 236 formed at the insulation layer 232 and the reflection layer 234 in FIG. 1.

Figure 2A:
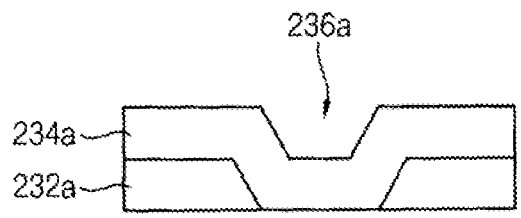
FIGS. 2A to 2D are cross-sectional views illustrating examples of the concave pattern formed at the insulation layer and the reflection layer in FIG. 1.

Referring to FIG. 2A, an opening or recess having a trapezoid shape in a cross-sectional view is formed at an insulation layer 232a, a reflection layer 234a is formed on the insulation layer 232a at which the opening or recess is formed, and thus a concave pattern 236a is formed at the reflection layer 234a. Thus, the concave pattern 236a may have the trapezoid shape in the cross-sectional view.

Figure 2B:
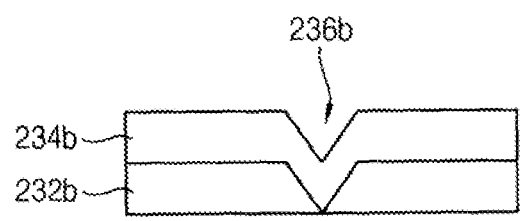

Referring to FIG. 2B, an opening or recess having an equilateral triangle shape in a cross-sectional view is formed at an insulation layer 232b, a reflection layer 234b is formed on the insulation layer 232b at which the opening or recess is formed, and thus a concave pattern 236b is formed at the reflection layer 234b. Thus, the concave pattern 236b may have the equilateral triangle shape in the cross-sectional view.

Figure 2C:
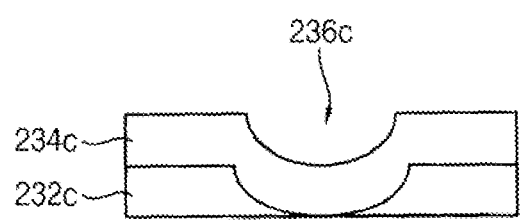

Referring to FIG. 2C, an opening or recess having a semicircle shape in a cross-sectional view is formed at an insulation layer 232c, a reflection layer 234c is formed on the insulation layer 232c at which the opening or recess is formed, and thus a concave pattern 236c is formed at the reflection layer 234c. Thus, the concave pattern 236c may have the semicircle shape in the cross-sectional view.

Figure 2D:
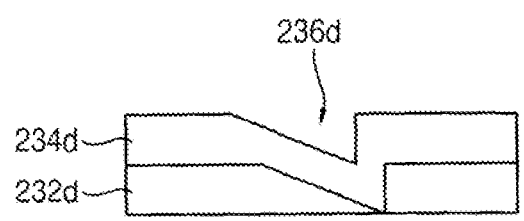

Referring to FIG. 2D, an opening or recess having a right triangle shape in a cross-sectional view is formed at an insulation layer 232d, a reflection layer 234d is formed on the insulation layer 232d at which the opening or recess is formed, and thus a concave pattern 236d is formed at the reflection layer 234d. Thus, the concave pattern 236d may have the right triangle shape in the cross-sectional view.

Figure 3A:
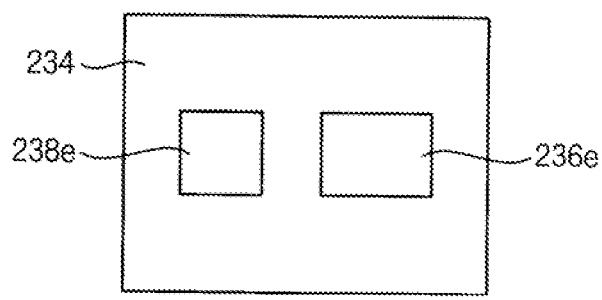
FIG. 3A to 3C are plan views illustrating examples of the concave pattern and the opening portion formed at the reflection layer of FIG. 1.
Figure 3B:
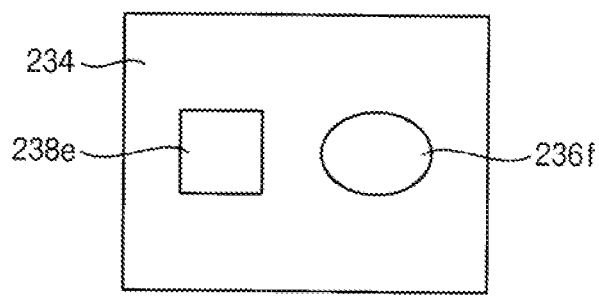
Figure 3C:
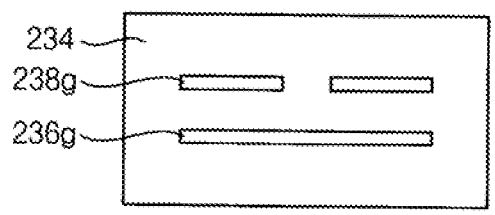

FIG. 3A to 3C are plan views illustrating examples of the concave pattern 236 and the opening portion 238 formed at the reflection layer 234 of FIG. 1.

Referring to FIG. 3A, an opening is formed at the insulation layer 232, the reflection layer 234 is laminated on the insulation layer 232 at which the opening is formed, and thus a concave pattern 236e is formed at the reflection layer 234. In addition, an opening portion 238e passing through the reflection layer 234 and the insulation layer 232 is formed. Each of the concave pattern 236e and the opening portion 238e may have a quadrangle shape in the plan view.

Referring to FIG. 3B, an opening is formed at the insulation layer 232, the reflection layer 234 is laminated on the insulation layer 232 at which the opening is formed, and thus a concave pattern 236f is formed at the reflection layer 234. In addition, the opening portion 238e passing through the reflection layer 234 and the insulation layer 232 is formed. The concave pattern 236f may have a circle shape and the opening portion 238e may have the quadrangle shape in the plan view.

Referring to FIG. 3C, an opening is formed at the insulation layer 232, the reflection layer 234 is laminated on the insulation layer 232 at which the opening is formed, and thus a concave pattern 236g is formed at the reflection layer 234. In addition, an opening portion 238g passing through the reflection layer 234 and the insulation layer 232 is formed. Each of the concave pattern 236g and the opening portion 238g may have a bar shape in the plan view.

In FIGS. 3A to 3C, the opening is formed at the insulation layer 232, however, a recess may be formed on the insulation layer 232, the reflection layer 234 may be laminated on the insulation layer 232 on which the recess is formed, and thus one of the concave patterns 236e, 236f and 236g may be formed at the reflection layer 234.

According to the examples of FIGS. 2A to 2D and FIGS. 3A to 3C, a shape of the concave pattern 236 and the opening portion 238 may be varied to realize a diffused reflection of light. In addition, when the concave pattern 236 has inclined surfaces facing each other as illustrated in FIGS. 2A, 2B and 2C, the light source part 210 may be additionally disposed adjacent to the light facing surface 224 of the first base substrate 220.

Referring to FIG. 1 again, the reflection plate 250 is disposed under the first base substrate 220 to reflect light reflected by the reflection layer 234, and the light reflected by the reflection plate 250 passes through the first base substrate 220 and is exiting through the opening portion 238.

The backlight assembly 200 may include optical sheets 240 between the first base substrate 220 and the reflection plate 250. The optical sheets 240 may have a diffusion sheet 242, a light-condensing sheet 244, and a prism sheet 246.

The display panel 300 is disposed on the backlight assembly 200, and displays an image using the light provided through the opening portion 238 of the backlight assembly 200.

The display panel 300 includes a second base substrate 310, a switching element 320, an insulation layer 330, electrodes 340, and a digital micro shutter 350.

The second base substrate 310 may include a glass material or a plastic material, and the second base substrate 310 may include signal lines such as a gate line and a data line intersecting with the gate line.

The switching element 320 may include a gate electrode connected to the gate line, a source electrode connected to the data line, and a drain electrode spaced apart from the source electrode and facing to the source electrode.

The insulation layer 330 is formed on the second base substrate 310 on which the signal lines are formed and the switching element 320.

The electrodes 340 are electrically connected to the switching element 320 and disposed on both sides of the digital micro shutter 350 to drive the digital micro shutter 350. The electrodes 340 form an electric field between two electrodes according to an electrical signal of the switching element 320 to move the digital micro shutter 350 in a horizontal direction parallel with the second base substrate 310.

The digital micro shutter 350 opens and closes the opening portion 238 of the backlight assembly 200 according to the driving of the electrodes 340. When the digital micro shutter 350 opens the opening portion 238, the light emitted from the backlight assembly 200 progresses to the second base substrate 310, and when the digital micro shutter 350 closes the opening portion 238, the light emitted from the backlight assembly 200 is blocked by the digital micro shutter 350.

The display apparatus 100 further includes an insulation fluid 400 between the backlight assembly 200 and the display panel 300. The insulation fluid 400 maintains straight properties of the light emitted from the backlight assembly 200, and for example, the insulation fluid 400 may include oil.

FIGS. 4A to 4E are cross-sectional views illustrating a method of manufacturing the backlight assembly 200 of FIG. 1.

Figure 4A:
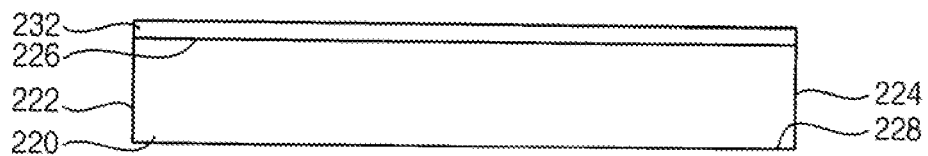
FIGS. 4A to 4E are cross-sectional views illustrating a method of manufacturing the backlight assembly of FIG. 1.

Referring to FIG. 4A, the insulation layer 232 is formed on the light exiting surface 226 of the first base substrate 220. The insulation layer 232 may include two layers, and respective layers may include the silica (SiO2) material and the titanium dioxide (TiO2) material.

Figure 4B:
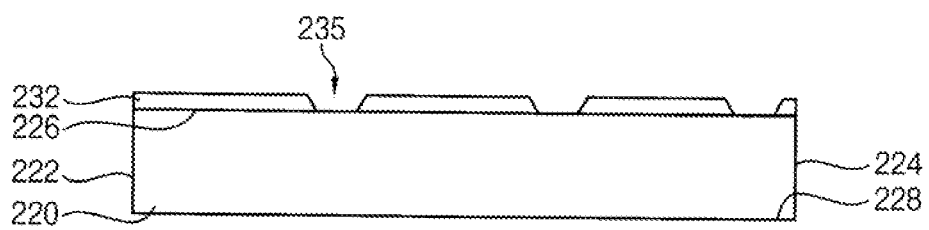

Referring to FIG. 4B, a concave pattern 235 is formed at the insulation layer 232. The concave pattern 235 includes an inclined surface close to the light exiting surface 226 as from the light incident surface 222 of the first base substrate 220 to the light facing surface 224 of the first base substrate 220. For example, the concave pattern 235 may be an opening or recess making contact with the light exiting surface 226 of the first base substrate 220, and the concave pattern 235 may have the trapezoid shape, the triangle shape or the semicircle shape. The opening or recess of the concave pattern 235 may be formed by etching the insulation layer 232 with an etching process using a mask, after disposing the mask at which a through hole corresponding to the opening is formed on the insulation layer 232.

Figure 4C:
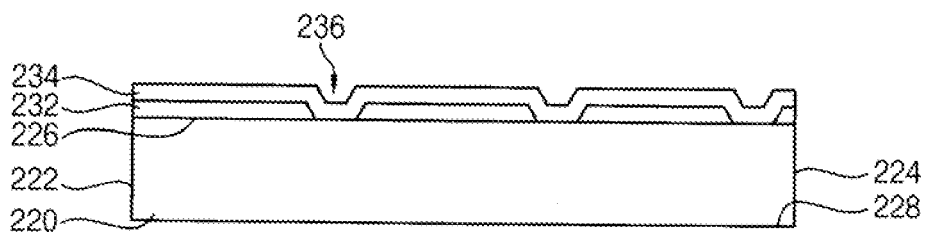

Referring to FIG. 4C, the reflection layer 234 is formed on the insulation layer 232 at which the opening or recess is formed so that the reflection layer 234 makes contact with the light exiting surface 226 of the first base substrate 220. The reflection layer 234 may be formed using at least one of a coating process, a sputtering process and a chemical vapor depositing process. A thickness of the reflection layer 234 is uniform, and thus the concave pattern 236 is formed at the reflection layer 234.

Figure 4D:
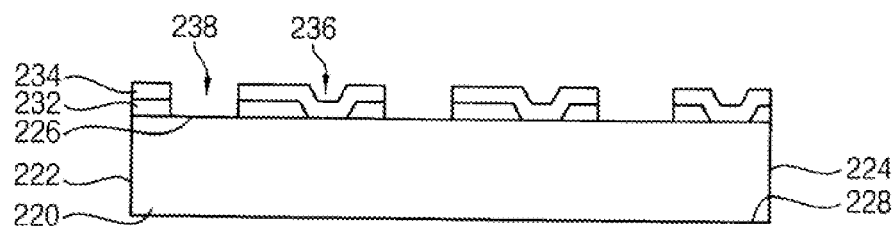

Referring to FIG. 4D, the opening portion 238 passing through the insulation layer 232 and the reflection layer 234 is formed. The opening portion 238 is adjacent to the concave pattern 236. The opening portion 238 may be formed by etching the reflection layer 234 and the insulation layer 232 with an etching process using a mask, after disposing the mask at which a through hole corresponding to the opening portion 238 is formed.

Figure 4E:
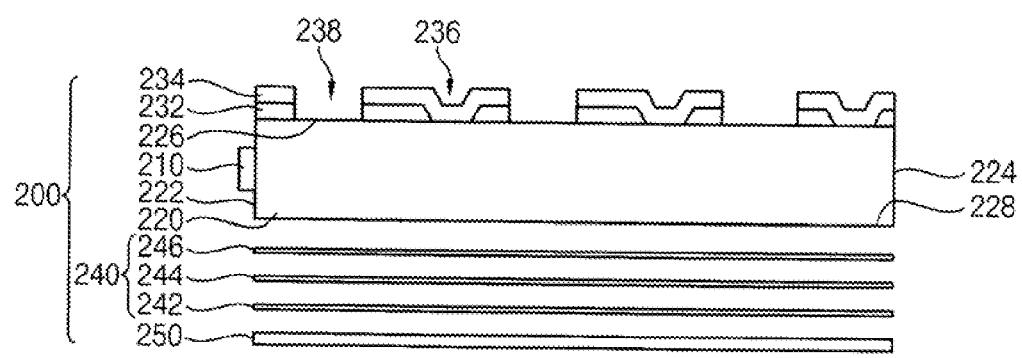

Referring to FIG. 4E, the optical sheets 240 and the reflection plate 250 are disposed under the first base substrate 220, and the light source part 210 is disposed at an area adjacent to the light incident surface 222 of the first base substrate 220.

Figure 5A:
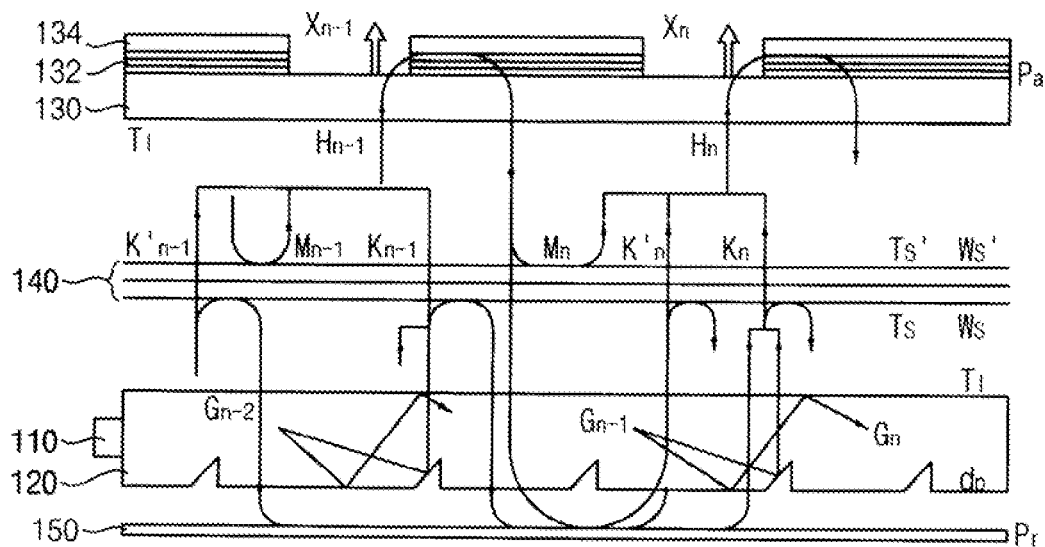
FIG. 5A is a cross-sectional view illustrating a simulation of a backlight assembly according to a comparison example embodiment.
Figure 5B:
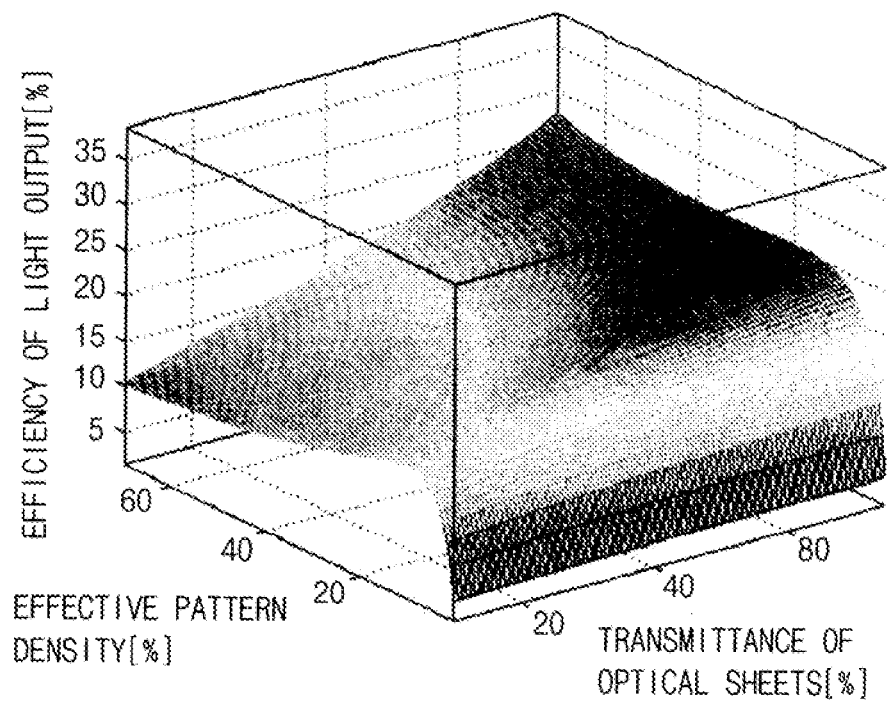
FIG. 5B is a graph illustrating an efficiency of a light output compared with a pattern density derived from the simulation of FIG. 5A.

FIG. 5A is a cross-sectional view illustrating a simulation of a backlight assembly according to a comparison example embodiment, and FIG. 5B is a graph illustrating an efficiency of a light output compared with a pattern density derived from the simulation of FIG. 5A.

Referring to FIG. 5A, the backlight assembly of the comparison example embodiment includes a light source part 110, a light guide plate 120, optical sheets 140, a base substrate 130, an insulation layer 132, a reflection layer 134, and a reflection plate 150.

An initial condition of the simulation according to the comparison example embodiment of FIG. 5A is following.

[Initial Condition of the Simulation According to the Comparison Example Embodiment]

$K_0=0$ $K'_0=0$ $G_0=L_0$ (initial input)

$H_0=0$ $M_0=0$

A quantity $K_0$ of light passing through the optical sheets 140 by the reflection layer 134, the reflection plate 150, and a pattern of the light guide plate 120 is 0; a quantity $K'_0$ of light reflected by the reflection layer 134 and the reflection plate 150 and passing through the optical sheets 140 not reflected by the optical sheets 140 is 0; a quantity $G_0$ of light inside of the light guide plate 120 is an initial input $L_0$ of light; a quantity $H_0$ of light exiting from the optical sheets 140 and incident to the base substrate 130 is 0; and a quantity $M_0$ of light reflected by the reflection layer 134 and reflected by the optical sheets 140 not passing through the optical sheets 140 is 0.

A parameter of the simulation according to the comparison example embodiment is following.

[Parameter of the Simulation According to the Comparison Example Embodiment]

$A_r=0.15$, $T'_s=T_s$, $W_s=0.05$, $\rho_a=0.98$, $\rho_r=0.98$, $T_l=0.99$

For example, an aperture ratio $A_r$ of the base substrate 130 is 0.15, an upward transmittance $T_s$ of the optical sheets 140 and a downward transmittance $T'_s$ of the optical sheets 140 are the same, A loss rate $W_s$ of light in the optical sheets 140 is 0.05, a reflectivity $\rho_a$ of the base substrate 130 is 0.98, a reflectivity $\rho_r$ of the reflection plate 150 is 0.98, and each of transmittances $T_l$ of the light guide plate 120 and the base substrate 130 is 0.99.

In the comparison example embodiment of FIG. 5A, the reflection plate 150, the light guide plate 120, optical sheets 140, and the base substrate 130 at which the opening portion is formed are sequentially disposed from a lower portion, the light incident to the light guide plate 120 from the light source part 110 is diffused-reflected by a pattern formed on a lower surface of the light guide plate 120, and thus mathematical equations deriving a quantity of light output emitted from the backlight assembly according to the simulation of the comparison example embodiment following.

[Mathematical Equations Deriving the Quantity of Light Output Emitted From the Backlight Assembly According to the Comparison Example Embodiment]

$$K_n = G_{n-1} d_p T_l T_s + \frac{K_{n-1}}{T_s}(1 - T_s - W_s)ZT_s$$

$$K'_n = H_{n-1}(1 - A_r)\rho_a T'_s ZT_s + \frac{K'_{n-1}}{T_s}(1 - T_s - W_s)ZT_s$$

$$M_n = H_{n-1}(1 - A_r)\rho_a T_l(1 - W'_s - T'_s)$$

$$G_n = G_{n-1} T_l(1 - d_p)T_l + H_{n-1}(1 - A_r)\rho_a T'_s T_l d_p T_l$$

$$X_n = H_n A_r T_l$$

$$H_n \equiv T_l(K_n + K'_n + M_n)$$

$$Z \equiv T_l T_l(1 - d_p)\rho_r T_l(1 - d_p)T_l = \rho_r T_l^4(1 - d_p)^2$$

$$F_{out} = \sum_{n=0}^{\infty} X_n$$

A quantity $H_n$ of light exiting from the optical sheets 140 and incident to the base substrate 130 is a multiplication of sum of a quantity $K_n$ of light passing through the optical sheets 140 by the reflection layer 134, the reflection plate 150 and the pattern of the light guide plate 120, a quantity $K'_n$ of light reflected by the reflection layer 134 and the reflection plate 150 and passing through the optical sheets 140 not reflected by the optical sheets 140 and a quantity $M_n$ of light reflected by the reflection layer 134 and reflected by the optical sheets 140 not passing through the optical sheets 140, and the transmittance $T_l$ of the base substrate 130.

A value of a character Z is "a multiplication of the reflectivity $p_r$ of the reflection plate 150, a fourth power of the transmittance $T_l$ of the light guide plate 120, a square of (1−an effective pattern density $d_p$)".

The quantity $K_n$ of light passing through the optical sheets 140 by the reflection layer 134, the reflection plate 150 and the pattern of the light guide plate 120 is calculated. For example, a multiplication of a quantity $G_{n-1}$ of light inside of the light guide plate 120, the effective pattern density $d_p$, the transmittance $T_l$ of the base substrate 130, and the upward transmittance $T_s$ of the optical sheets 140 is added to a multiplication quantity $K_{n-1}$ of light passing through the optical sheets 140 by the reflection layer 134, the reflection plate 150 and the pattern of the light guide plate 120, (1−the upward transmittance $T_s$ of the optical sheets 140−the loss rate $W_s$ of light in the optical sheets 140) and the value of the character Z.

The quantity $K'_n$ of light reflected by the reflection layer 134 and the reflection plate 150 and passing through the optical sheets 140 not reflected by the optical sheets 140 is calculated. For example, a multiplication of a quantity $H_{n-1}$ of light exiting from the optical sheets 140 and incident to the base substrate 130, (1−the aperture ratio $A_r$ of the base substrate 130), the reflectivity $p_a$ of the base substrate 130, the downward transmittance $T'_s$ of the optical sheets 140, the value of the character Z and the upward transmittance $T_s$ of the optical sheets 140 is added to a multiplication of a quantity $K'_{n-1}$ of light reflected by the reflection layer 134 and the reflection plate 150 and passing through the optical sheets 140 not reflected by the optical sheets 140, (1−the upward transmittance $T_s$ of the optical sheets 140−the loss rate $W_s$ of light in the optical sheets 140) and the value of the character Z.

The quantity $M_n$ of light reflected by the reflection layer 134 and reflected by the optical sheets 140 not passing through the optical sheets 140 is calculated. For example, the quantity $H_{n-1}$ of light exiting from the optical sheets 140 and incident to the base substrate 130, (1−the aperture ratio $A_r$ of the base substrate 130), the reflectivity $p_a$ of the base substrate 130, the transmittance $T_l$ of the base substrate 130, and (1−a downward loss rate $W'_s$ of light in the optical sheets 140−the downward transmittance $T'_s$ of the optical sheets 140) are multiplied.

The quantity $G_0$ of light inside of the light guide plate 120 is calculated. For example, a multiplication of the quantity $G_{n-1}$ of light inside of the light guide plate 120, the transmittance $T_l$ of the light guide plate 120, (1−the effective pattern density $d_p$) and the transmittance $T_l$ of the light guide plate 120 is added to a multiplication of the quantity $H_{n-1}$ of light exiting from the optical sheets 140 and incident to the base substrate 130, (1−the aperture ratio $A_r$ of the base substrate 130), the reflectivity $p_a$ of the base substrate 130, the downward transmittance $T'_s$ of the optical sheets 140, the transmittance $T_l$ of the light guide plate 120, the effective pattern density $d_p$ and the transmittance $T_l$ of the light guide plate 120.

A quantity $X_n$ of light exiting through the opening portion of the base substrate 130 is calculated. For example, the quantity $H_n$ of light exiting from the optical sheets 140 and incident to the base substrate 130, the aperture ratio $A_r$ of the base substrate 130 and the transmittance $T_l$ of the base substrate 130 are multiplied.

A quantity $F_{out}$ of light emitted from the backlight assembly is calculated by summing the quantity of light exiting from each of the opening portions.

Referring to FIG. 5B, a relation among the effective pattern density, the transmittance of the optical sheets, and the efficiency of the light output is illustrated. The efficiency of the light output may be a result of dividing the quantity $F_{out}$ of light emitted from the backlight assembly by a quantity of light incident to the light guide plate 120 derived from the simulation of FIG. 5A. In the backlight assembly according to the comparison example embodiment, the efficiency of light output increases as the effective pattern density increases when the effective pattern density is not more than about 20 percent. However, the efficiency of light output increase decreases or slows down according to the transmittance of the optical sheets 140 when the effective pattern density is more than about 20 percent. For example, in a case that the effective pattern density is more than about 20 percent, when the transmittance of the optical sheets 140 is not more than about 70 percent, the efficiency of light output decreases as the effective pattern density increases, and when the transmittance of the optical sheets 140 is more than 70 percent, the efficiency of light output increase slows down as the effective pattern density increases compared when the effective pattern density is not more than about 20 percent. Thus, in the comparison example embodiment, the efficiency of light output may decrease according to the transmittance of the optical sheets 140 even though the effective pattern density increases.

Figure 6A:
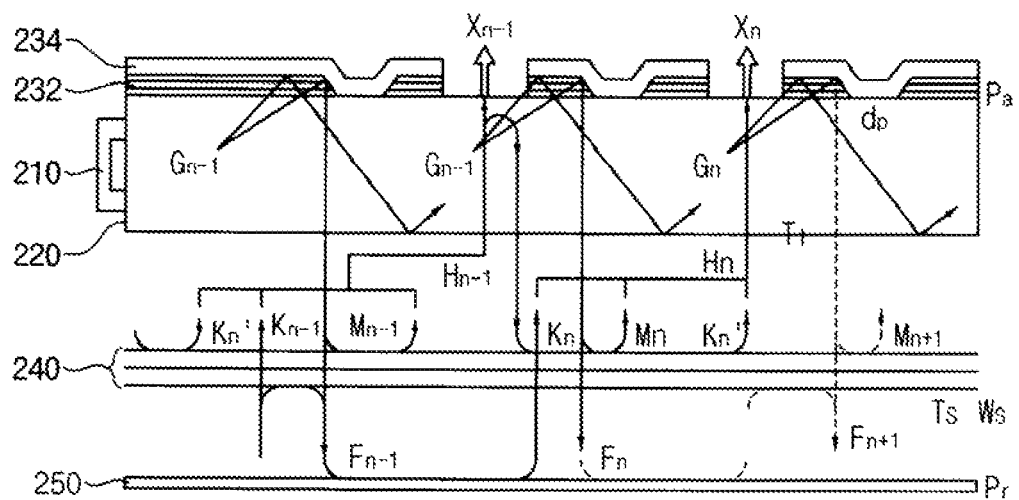
FIG. 6A is a cross-sectional view illustrating a simulation of the backlight assembly according to the present example embodiment of FIG. 1.
Figure 6B:
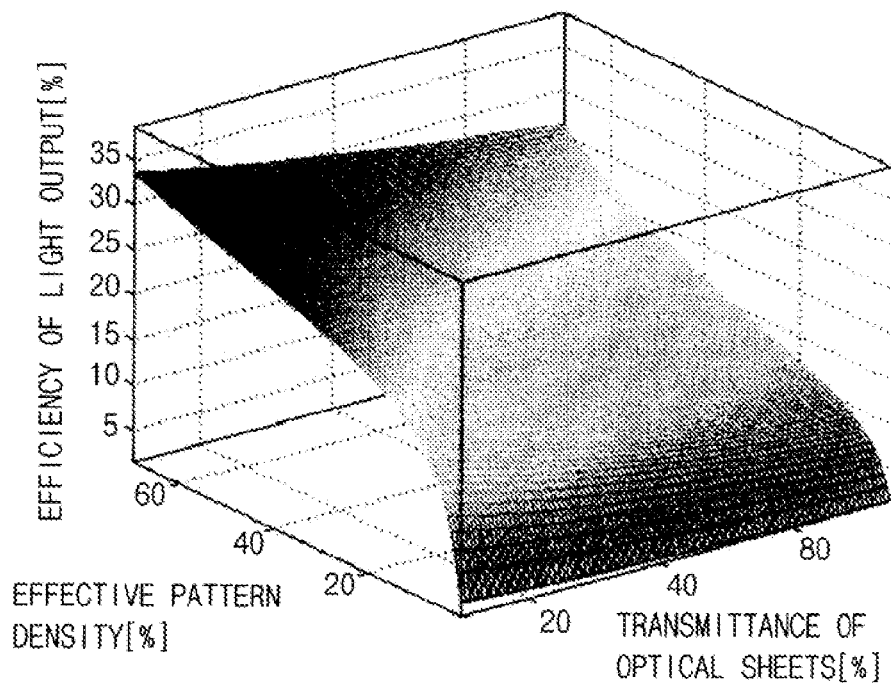
FIG. 6B is a graph illustrating an efficiency of a light output compared with a pattern density derived from the simulation of FIG. 6A

FIG. 6A is a cross-sectional view illustrating a simulation of the backlight assembly 200 according to the present example embodiment of FIG. 1, and FIG. 6B is a graph illustrating an efficiency of a light output compared with a pattern density derived from the simulation of FIG. 6A.

An initial condition of the simulation according to the present example embodiment of FIG. 6A is following.

[Initial Condition of the Simulation According to the Present Example Embodiment]

$K_0=0$
$K'_0=0$
$G_0=L_0$ (initial input)
$H_0=0$
$M_0=0$
$F_0=0$

A quantity $K_0$ of light reflected by the reflection layer 234 and the reflection plate 250 and passing through the optical sheets 240 is 0, a quantity $K'_0$ of light reflected by the optical sheets 240 in light exiting from the first base substrate 220 to the optical sheets 240 is 0, a quantity $G_0$ of light inside of the first base substrate 220 is an initial input $L_0$ of light, a quantity $H_0$ of light exiting from the optical sheets 240 and incident to the first base substrate 220 is 0, a quantity $M_0$ of light reflected by the reflection layer 234 and reflected by the optical sheets 240 not passing through the optical sheets 240 is 0, and a quantity $F_0$ of light reflected by the reflection layer 234 and passing through the optical sheets 240 is 0.

A parameter of the simulation according to the present example embodiment is equal to the parameter of the simulation according to the comparison example embodiment.

In the present example embodiment of FIG. 6A, the reflection plate 250, the optical sheets 240 and the first base substrate 220 at which the opening portion is formed are sequentially disposed from a lower portion. Light incident to the first base substrate 220 is diffused-reflected by a pattern formed on an upper surface of the first base substrate 220, and thus mathematical equations deriving a quantity of light output emitted from the backlight assembly 200 according to the simulation of the present example embodiment following.

[Mathematical Equations Deriving the Quantity of Light Output Emitted From the Backlight Assembly According to the Present Example Embodiment]

$$M_n = G_{n-1} d_p \rho_a T_l (1 - T_s - W_s)$$

$$F_n = F_{n-1} \rho_r (1 - T_s - W_s) + G_{n-1} d_p \rho_a T_l T_s$$

$$K_n = F_{n-1} \rho_r T_s$$

$$K'_n = H_{n-1} \rho_a (1 - d_p - A_r)(1 - T_s - W_s)$$

$$G_n = G_{n-1} T_l (1 - d_p) T_l$$

$$H_n = T_l (K_n + K'_n + M_n)$$

$$X_n = H_n A_r T_l$$

$$F_{out} = \sum_{n=0}^{\infty} X_n$$

A quantity $M_n$ of light reflected by the reflection layer 234 and reflected by the optical sheets 240 not passing through the optical sheets 240 is calculated. For example, a quantity $G_{n-1}$ of light inside of the first base substrate 220, an effective pattern density $d_p$, a reflectivity $p_a$ of the first base substrate 220, a transmittance $T_l$ of the first base substrate 220, and (1–a transmittance $T_s$ of the optical sheets 240–a loss rate $W_s$ of light in the optical sheets 240) are multiplied.

A quantity $F_n$ of light reflected by the reflection layer 234 and passing through the optical sheets 240 is calculated. For example, a multiplication of a quantity $F_{n-1}$ of light reflected by the reflection layer 234 and passing through the optical sheets 240, a reflectivity $p_r$ of the reflection plate 250 and (1–the transmittance $T_s$ of the optical sheets 240–the loss rate $W_s$ of light in the optical sheets 240) is added to a multiplication of the quantity $G_{n-1}$ of light inside of the first base substrate 220, the effective pattern density $d_p$, the reflectivity $p_a$ of the first base substrate 220, the transmittance $T_l$ of the first base substrate 220 and the transmittance $T_s$ of the optical sheets 240).

A quantity $K_n$ of light reflected by the reflection layer 234 and the reflection plate 250 and passing through the optical sheets 240 is calculated. For example, the quantity $F_{n-1}$ of light reflected by the reflection layer 234 and passing through the optical sheets 240, reflectivity $p_r$ of the reflection plate 250 and the transmittance $T_s$ of the optical sheets 240 are multiplied.

A quantity $K'_n$ of light reflected by the optical sheets 240 in light exiting from the first base substrate 220 to the optical sheets 240 is calculated. For example, a quantity $H_{n-1}$ of light exiting from the optical sheets 240 and incident to the first base substrate 220, the reflectivity $p_a$ of the first base substrate 220, (1–the effective pattern density $d_p$–an aperture ratio $A_r$ of the first base substrate 220) and (1–the transmittance $T_s$ of the optical sheets 240–the loss rate $W_s$ of light in the optical sheets 240) are multiplied.

A quantity $G_0$ of light inside of the first base substrate 220 is calculated. For example, the quantity $G_{n-1}$ of light inside of the first base substrate 220, the transmittance $T_l$ of the first base substrate 220, (1–the effective pattern density $d_p$) and the transmittance $T_l$ of the first base substrate 220 are multiplied.

A quantity $H_n$ of light exiting from the optical sheets 240 and incident to the first base substrate 220 is calculated. For example, a sum of the quantity $K_n$ of light reflected by the reflection layer 234 and the reflection plate 250 and passing through the optical sheets 240, the quantity $K'_n$ of light reflected by the optical sheets 240 in light exiting from the first base substrate 220 to the optical sheets 240 and the quantity $M_n$ of light reflected by the reflection layer 234 and reflected by the optical sheets 240 not passing through the optical sheets 240 is multiplied by the transmittance $T_l$ of the first base substrate 220.

A quantity $X_n$ of light exiting through the opening portion of the first base substrate 220 is calculated. For example, the quantity $H_n$ of light exiting from the optical sheets 240 and incident to the first base substrate 220, the aperture ratio $A_r$ of the first base substrate 220 and the transmittance $T_l$ of the first base substrate 220 are multiplied.

A quantity $F_{out}$ of light emitted from the backlight assembly is calculated by summing the quantity of light exiting from each of the opening portions.

Referring to FIG. 6B, a relation among the effective pattern density, the transmittance of the optical sheets, and the efficiency of the light output is illustrated. The efficiency of the light output may be a result of dividing the quantity $F_{out}$ of light emitted from the backlight assembly by a quantity of light incident to the first base substrate 220 derived from the simulation of FIG. 6A. In the backlight assembly 200 according to the present example embodiment, the efficiency of light output increases as the effective pattern density increases. Even though an increase rate of the efficiency of light output compared with the effective pattern density decreases as the transmittance of the optical sheets 240 increases, the efficiency of light output compared with the effective pattern density steadily increases as the transmittance of the optical sheets 240 increases. Thus, in the present example embodiment, even though the transmittance of the optical sheets 240 increases, the efficiency of light output increases as the effective pattern density increases.

Figure 7:
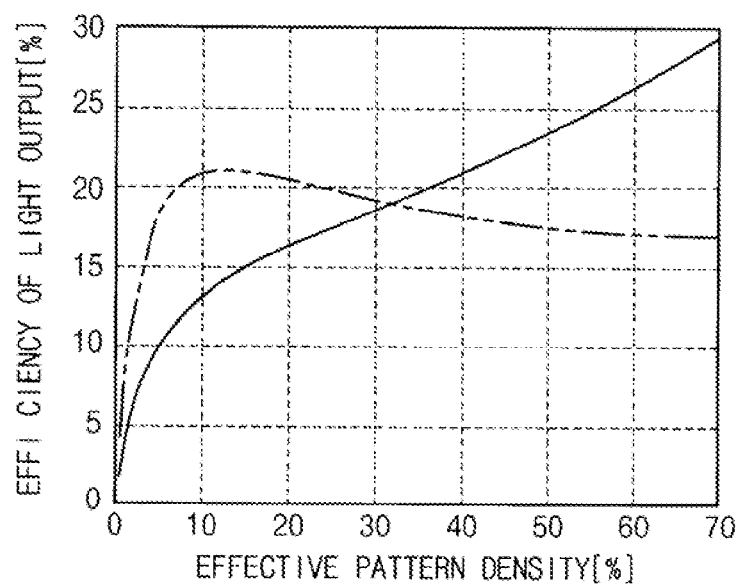
FIG. 7 is a graph illustrating the efficiency of light output compared with the effective pattern density according to the comparison example embodiment of FIG. 5A and the present example embodiment of FIG. 1.

FIG. 7 is a graph illustrating the efficiency of light output compared with the effective pattern density according to the comparison example embodiment of FIG. 5A and the present example embodiment of FIG. 1.

Referring to FIG. 7, when the transmittance of the optical sheets 140 and 240 is about 0.6, in the comparison example embodiment illustrated with a dotted chain line, the efficiency of light output decreases when the effective pattern density increases more than about 10 percent, however, in the present example embodiment illustrated with a solid line, the efficiency of light output increases as the effective pattern density increases. Thus, in the comparison example embodiment, the efficiency of light output is about 21 percent when the effective pattern density is about 12 percent, however, in the present example embodiment, the efficiency of light output is about 27 percent even though the effective pattern density is about 60 percent. In addition, in the comparison example embodiment, a turning point of the effective pattern density that the efficiency of light output increase decreases and a point of the effective pattern density that the efficiency of light output rapidly increases is about 10 percent.

In the present example embodiment, the display panel 300 is a display panel based on a micro electro-mechanical system including the digital micro shutter 350, however it is not limited thereto, and thus the display panel 300 may be one of a liquid crystal display panel including a liquid crystal, an electrophoretic display panel including an electrophoretic layer and an organic light-emitting panel including an organic light-emitting layer.

According to the present example embodiment, a lower surface of the first base substrate 220 is flat, the reflection layer 234 having the concave pattern 236 is formed on the light exiting surface 226 of the first base substrate 220, and thus an efficiency of light exiting from the first base substrate 220 and re-incident to the first base substrate may increase.

In addition, in a backlight assembly used in a display apparatus based on a micro electro mechanical system, a glass substrate except for the first base substrate 220 is not required to be included in the backlight assembly, and thus a thickness of the display apparatus may decrease.

Figure 8:
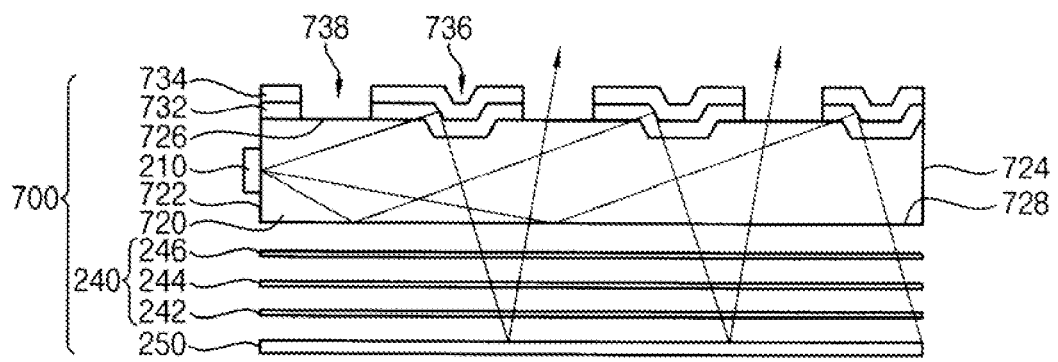
FIG. 8 is a cross-sectional view illustrating a backlight assembly according to another example embodiment.

FIG. 8 is a cross-sectional view illustrating a backlight assembly according to another example embodiment.

The backlight assembly 700 according to the present example embodiment may be included in the display apparatus 100 of FIG. 1, and the backlight assembly 700 is substantially the same as the backlight assembly 200 according to the previous example embodiment illustrated in FIG. 1 except for a first base substrate 700, an insulation layer 732 and a reflection layer 734. Thus, the same reference numerals will be used to refer to same or like parts as those described in the previous example embodiment and any further repetitive explanation concerning the above elements will be omitted.

Referring to FIG. 8, the backlight assembly 700 includes a light source part 210, a first base substrate 720, the insulation layer 732, the reflection layer 734 and the reflection plate 250.

The first base substrate 720 includes a light incident surface 722 into which the light emitted from the light source part 210 is incident, a light facing surface 724 facing the light incident surface 722, a light exiting surface 726 connected to the light incident surface 722 and the light facing surface 724 and through which the light incident from the light source part 210 exits, and a light reflection surface 728 facing the light exiting surface 726 and reflecting the light in the first base substrate 720. A recess is formed on the light exiting surface 726, and the recess has an inclined surface close to the light reflection surface 728 as from the light incident surface 722 to the light facing surface 724.

The insulation layer 732 and the reflection layer 734 are uniformly formed on the light exiting surface 726 on which the recess is formed, and thus a concave pattern 736 is formed at the reflection layer 734. Thus, the reflection layer 734 forms the concave pattern 736 along with the first base substrate 720 and the insulation layer 732. In addition, an opening portion 738 passing through the insulation layer 732 and the reflection layer 734 is formed at the insulation layer 732 and the reflection layer 734. The opening portion 738 is adjacent to the concave pattern 736, and a portion of the light exiting from the light exiting surface 726 of the first base substrate 720 passes through the opening portion 738.

The recess formed at the first base substrate 720 and the concave pattern 736 may have at least one of a trapezoid shape, an equilateral triangle shape, a right triangle shape and a semicircle shape in a cross-sectional view as illustrated in FIGS. 2A to 2D. In addition, the recess formed at the first base substrate 720 and the concave pattern 736 may have at least one of a quadrangle shape, a circle shape and a bar shape in a plan view as illustrated in FIGS. 3A to 3C.

The reflection layer 734 reflects light not exiting through the opening portion 738 in the light exiting from the light exiting surface 726 of the first base substrate 720. The reflection layer 734 includes the concave pattern 736 concave toward the first base substrate 720, and thus light bumped into the concave pattern 736 is inconsistent with a total reflection condition of light and exiting toward the reflection plate 250 as passing through the first base substrate 720. For example, the reflection layer 734 may include an aluminum material.

The insulation layer 732 is formed under the reflection layer 734 to increase a reflectivity of the reflection layer 734. For example, the insulation layer 732 may include two layers, and respective layers may include a silica ($SiO_2$) material and a titanium dioxide ($TiO_2$) material.

FIGS. 9A to 9D are cross-sectional views illustrating a method of manufacturing the backlight assembly 700 of FIG. 8.

Figure 9A:
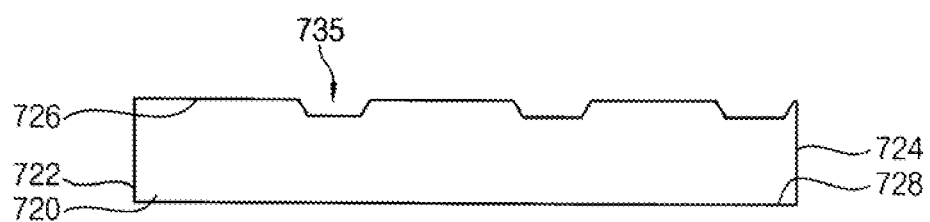
FIGS. 9A to 9D are cross-sectional views illustrating a method of manufacturing the backlight assembly of FIG. 8.

Referring to FIG. 9A, a concave pattern 735 is formed at a portion of the light exiting surface 726 of the first base substrate 720. The concave pattern 735 may be formed by etching the portion of the light exiting surface 726 of the first base substrate 720 with an etching process using a mask, after disposing the mask at which a through hole corresponding to the concave pattern 735 is formed on the first base substrate 720.

Figure 9B:
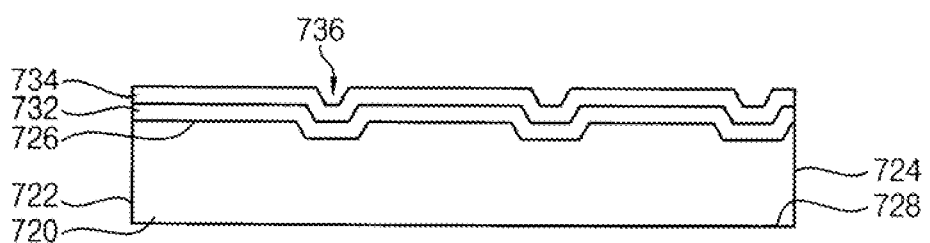

Referring to FIG. 9B, the insulation layer 732 and the reflection layer 734 are sequentially laminated on the first base substrate 720 on which the concave pattern 735 is formed to form the concave pattern 736 at the reflection layer 734. Each of the insulation layer 732 and the reflection layer 734 may be formed using at least one of a coating process, a sputtering process and a chemical vapor depositing process.

Figure 9C:
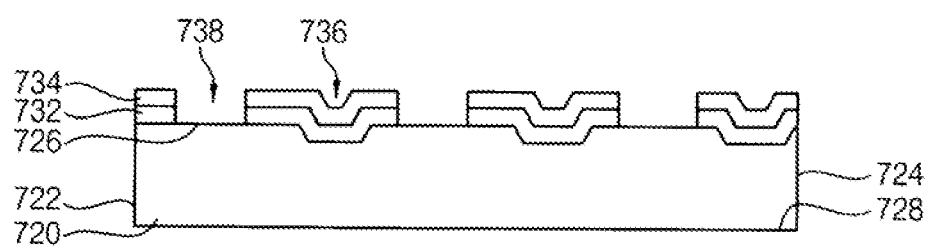

Referring to FIG. 9C, the opening portion 738 passing through the insulation layer 732 and the reflection layer 734 is formed. The opening portion 738 is adjacent to the concave pattern 736. The opening portion 738 may be formed by etching the reflection layer 734 and the insulation layer 732 with an etching process using a mask, after disposing the mask at which a through hole corresponding to the opening portion 738 is formed.

Figure 9D:
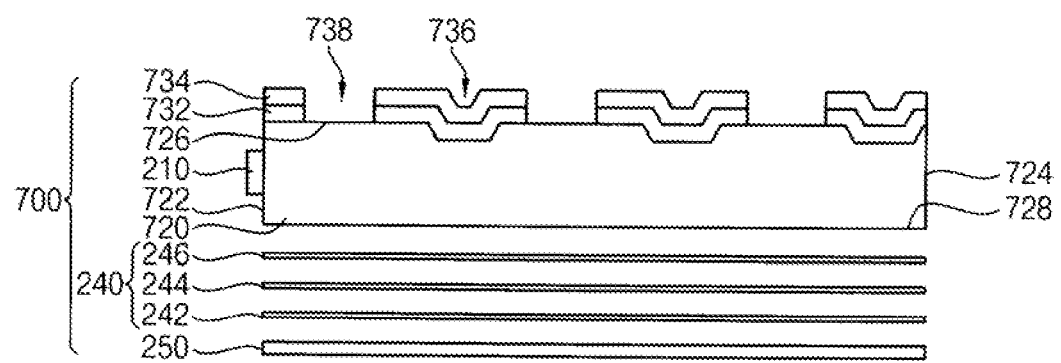

Referring to FIG. 9D, the optical sheets 240 and the reflection plate 250 are disposed under the first base substrate 720, and the light source part 210 is disposed at an area adjacent to the light incident surface 722 of the first base substrate 720.

According to the present example embodiment, the concave pattern 735 is formed on the light exiting surface 726 of the first base substrate 720, the insulation layer 732 and the reflection layer 734 are formed on the first base substrate 720 on which the concave pattern 735 is formed, and thus a thickness of the backlight assembly 700 and a thickness of a display apparatus having the backlight assembly 700 may decrease.

According to the backlight assembly, the method of manufacturing the backlight assembly and the display apparatus having the backlight assembly, a lower surface of a base substrate into which light is incident is flat, a reflection layer having a concave pattern is formed on the base substrate, and thus efficiency of light exiting from the base substrate and re-incident to the base substrate may increase.

In addition, in a backlight assembly used in a display apparatus based on a micro electro-mechanical system, a further glass substrate except for a base substrate into which light is incident is not required, and thus a thickness of the display apparatus may decrease.

The foregoing is illustrative of the disclosed subject matter and is not to be construed as limiting thereof. Although a few example embodiments have been described, those skilled in the art will readily appreciate that many modifications are possible in the example embodiments without materially departing from the novel teachings and advantages. Accordingly, all such modifications are intended to be included within the scope as defined in the claims. In the claims, means-plus-function clauses are intended to cover the structures described herein as performing the recited function and not only structural equivalents but also equivalent structures. Therefore, it is to be understood that the foregoing is illustrative and is not to be construed as limited to the specific example embodiments disclosed, and that modifications to the disclosed example embodiments, as well as other example embodiments, are intended to be included within the scope of the appended claims.

What is claimed is:

1. A backlight assembly comprising:
   a light source part configured to generate light;
   a base substrate including a light incident surface into which the light from the light source part is to be incident, and a light exiting surface adjacent to the light incident surface and through which the light is to exit;
   an insulation layer disposed on the light exiting surface of the base substrate, the insulation layer comprising a first surface contacting the light exiting surface of the base substrate and a second surface facing the first surface; and
   a reflection layer disposed on the insulation layer, the reflection layer forming a concave pattern along with at least one of the base substrate and the insulation layer, and having an opening portion configured to pass light exiting from the light exiting surface, the opening portion extending through the reflection layer so that the reflection layer lies entirely outside the opening portion and covers the entire second surface of the insulation layer and extends beyond the concave pattern.

2. The backlight assembly of claim 1, wherein an opening is formed at the insulation layer, the reflection layer is formed on the insulation layer at which the opening is formed and the reflection layer directly contacts the light exiting surface of the base substrate through the opening to form the concave pattern.

3. The backlight assembly of claim 2, wherein a cross section of the opening formed at the insulation layer is one of a triangle shape, a trapezoid shape, and a semicircle shape.

4. The backlight assembly of claim 1, wherein a recess is formed on the insulation layer, and the reflection layer is formed on the insulation layer on which the recess is formed to form the concave pattern.

5. The backlight assembly of claim 4, wherein a cross section of the recess formed on the insulation layer is one of a triangle, a trapezoid, and a semicircle.

6. The backlight assembly of claim 1, wherein a recess is formed on the light exiting surface of the base substrate, and the insulation layer and the reflection layer are sequentially formed on the light exiting surface on which the recess is formed to form the concave pattern.

7. The backlight assembly of claim 6, wherein a cross section of the recess formed on the light exiting surface is one of a triangle, a trapezoid, and a semicircle.

8. The backlight assembly of claim 1, wherein the reflection layer includes an aluminum material.

9. The backlight assembly of claim 1, further comprising:
   a reflection plate formed under the base substrate; and
   optical sheets formed between the base substrate and the reflection plate.

10. The backlight assembly of claim 1, wherein the opening portion is adjacent to the concave pattern.

11. A method of manufacturing a backlight assembly, comprising:
    forming an insulation layer on a light exiting surface of a base substrate that includes a light incident surface into which light is incident, the light exiting surface being adjacent to the light incident surface and through which the light is to exit, the insulation layer comprising a first surface contacting the light exiting surface of the base substrate and a second surface facing the first surface;
    forming a concave pattern at the insulation layer;
    forming a reflection layer on the insulation layer at one or more positions at which the concave pattern is formed;
    forming an opening portion passing through the insulation layer and the reflection layer so that the reflection layer lies entirely outside the opening portion and covers of the entire second surface of the insulation layer and extends beyond the concave pattern; and
    disposing a light source part proximate to the light incident surface of the base substrate, the light source part configured to direct light upon the light incident surface of the base substrate.

12. The method of claim 11, wherein an opening is formed at the insulation layer by etching the insulation layer to form the concave pattern at the insulation layer, and
    the reflection layer is formed on the insulation layer so that the reflection layer directly contacts the light exiting surface of the base substrate.

13. The method of claim 11, wherein a recess is formed on the insulation layer by etching the insulation layer to form the concave pattern at the insulation layer, and
    the reflection layer is formed on the insulation layer and over the recess.

14. The method of claim 11, wherein the opening portion passing through the insulation layer and the reflection layer is adjacent to the concave pattern.

15. The method of claim 11, further comprising:
    disposing a reflection plate under the base substrate; and
    disposing optical sheets between the base substrate and the reflection plate.

16. A method of manufacturing a backlight assembly, comprising:
    forming a concave pattern at a light exiting surface of a base substrate that includes a light incident surface into which light is incident, the light exiting surface being adjacent to the light incident surface and through which the light is to exit;
    forming an insulation layer on the base substrate at one or more positions at which the concave pattern is formed, the insulation layer comprising a first surface contacting the light exiting surface of the base substrate and a second surface facing the first surface;
    forming a reflection layer on the insulation layer;
    forming an opening portion passing through the insulation layer and the reflection layer so that the reflection layer lies entirely outside the opening portion and covers the entire second surface of the insulation layer and extends beyond the concave pattern; and
    disposing a light source part proximate to the light incident surface of the base substrate, the light source part configured to direct light upon the light incident surface of the base substrate.

17. The method of claim 16, wherein a recess is formed on the light exiting surface of the base substrate by etching the light exiting surface of the base substrate to form the concave pattern at the light exiting surface of the base substrate.

18. The method of claim 11, wherein the opening portion passing through the insulation layer and the reflection layer is adjacent to the concave pattern.

19. A display apparatus comprising:
    a backlight assembly including a light source part configured to generate light, a base substrate including a light incident surface into which the light from the light source part is to be incident, and a light exiting surface adjacent to the light incident surface and through which the light is to exit, an insulation layer disposed on the light exiting surface of the base substrate and comprising a first surface contacting the light exiting surface of the base substrate and a second surface facing the first surface and a reflection layer disposed on the light exiting surface to form a concave pattern and having an opening portion configured to pass light exiting from the light exiting surface, the opening portion extending through the reflection layer so that the reflection layer lies entirely outside the opening portion and covers an entire portion of the second surface of the insulation layer; and a display panel disposed on the backlight assembly and displaying an image using the light passing through the opening portion.

20. The display apparatus of claim 19, wherein the display panel further includes a shutter disposed on the opening portion to open and close the opening portion.

* * * * *